United States Patent [19]

Ammann

[11] 4,180,751

[45] Dec. 25, 1979

[54] MODE-LOCKED OPTICAL PARAMETRIC OSCILLATOR APPARATUS

[75] Inventor: Eugene O. Ammann, Los Altos, Calif.

[73] Assignee: GTE Sylvania Incorporated, Stamford, Conn.

[21] Appl. No.: 940,530

[22] Filed: Sep. 8, 1978

[51] Int. Cl.² ............................................. H03F 7/00
[52] U.S. Cl. .................................. 307/428; 331/107 R
[58] Field of Search ............................ 307/88.3, 428; 331/107 R

[56] References Cited

PUBLICATIONS

Weisman et al., "Optics Communication", Oct. 1976, pp. 28-32.
Becker et al., "Journal of Applied Physics", Sep. 1974, pp. 3996-4005.

*Primary Examiner*—Rudolph V. Rolinec
*Assistant Examiner*—Darwin R. Hostetter
*Attorney, Agent, or Firm*—John F. Lawler

[57] ABSTRACT

Improved mode-locked optical parametric oscillator apparatus comprises a mode-locked pump laser having a cavity with a predetermined effective length $l_p$ and a parametric oscillator having a nonlinear crystal, such as lithium niobate ($LiNbO_3$), and singly resonant mirrors spaced apart by an effective distance $l_o$ which is substantially less than $l_p$, i.e., $l_p \approx nl_o$ where $n \approx 5$–50. The interaction of the mode-locked pump output with the nonlinear crystal produces parametric outputs at signal ($f_s$) and idler ($f_i$) frequencies, the parametric oscillator mirrors being singly resonant at one of those two frequencies. The parametric oscillator may be disposed either externally of or within the pump cavity and the pump laser optionally may be Q-switched. The parametric oscillator apparatus of this invention greatly increases the stability of the mode-locked output under normal operating conditions and enables relatively wide tuning of the apparatus without adjustment of the pump or oscillator cavity lengths.

9 Claims, 5 Drawing Figures

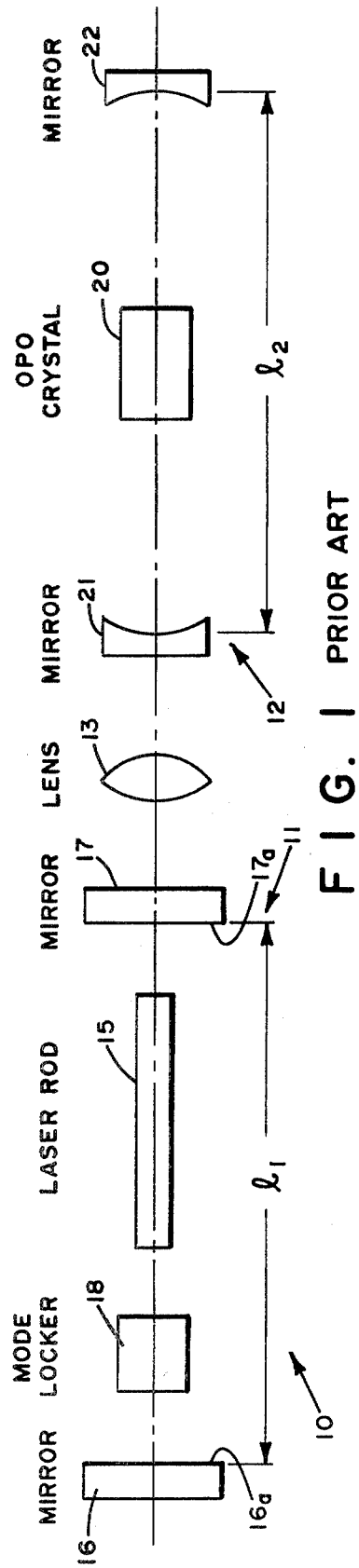
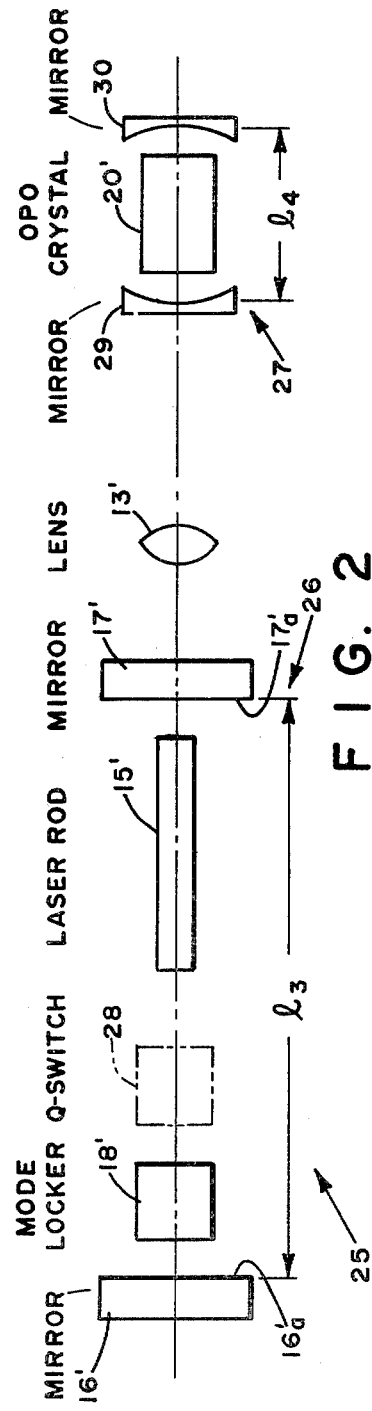
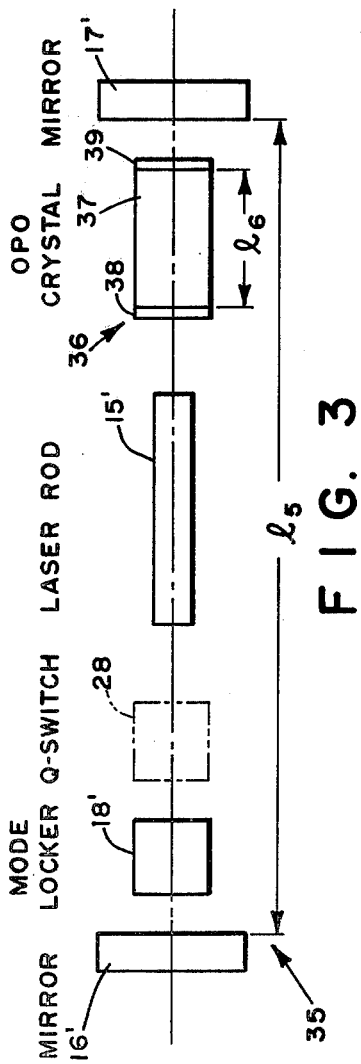

MODE-LOCKED OPTICAL PARAMETRIC OSCILLATOR APPARATUS

BACKGROUND OF THE INVENTION

This invention relates to improved mode-locked optical parametric oscillator (OPO) apparatus.

Mode-locked OPO apparatus is useful in generating extremely short pulses (1-0.001 nanoseconds) of light tunable over the oscillator band for various sub-nanosecond spectroscopy phenomena investigations such as the study of rapidly decaying transitions in certain chemical processes. In the past, such tunable mode locking in the visible spectrum has been achieved with dye lasers, but such lasers have outputs with wavelengths limited to about 1 $\mu$m or less, i.e., in the visible spectrum. A mode-locked dye laser of this type is described by Ippen, Shank and Dienes in APPLIED PHYSICS LETTERS, Oct. 15, 1972, pp. 348-350.

In addition to the above, sub-nanosecond pulses of light in the infrared spectrum have been produced in the past with solid state laser apparatus in which the effective lengths of the pump and the OPO cavities are identical. In a parametric oscillator, the relationship between the pump, signal and idler frequencies is $$f_p = f_s + f_i \qquad (1)$$

When any of the components are resonated (two are resonated in a singly-resonant OPO and all three are resonated in a doubly-resonant OPO), their frequencies can occur only as a "comb" of equally spaced modes having a separation of $c/2l$, where $c$ is the velocity of light in vacuum and $l$ is the effective resonator length for that particular component. The reason for the requirement of identical effective cavity lengths for previous OPOs is that this results in combs of modes with equal frequency separations thereby allowing Equation (1) to be satisfied. However, in a doubly-resonant OPO if for any reason either the pump cavity or signal/idler cavity lengths change by a fraction of an optical wavelength, that comb of frequencies will be shifted sideways and the three combs of resonant frequencies will no longer satisfy Equation (1).

As the OPO is tuned away from degeneracy, defined as the condition in Equation (1) at which $f_s = f_i$, the signal and idler wavelengths change with the former decreasing and the latter increasing. In the above prior art OPO, such tuning rapidly extinguishes OPO operation from two different effects. First, in a doubly-resonant OPO, the signal and idler indices of refraction assume new values after tuning and the signal and idler combs of modes are shifted sideways relative to each other. As a result, the individual cavity resonances no longer have values necessary to satisfy Equation (1).

The second effect occurs more gradually and effects both singly- and doubly-resonant OPOs. As the OPO is tuned well away from degeneracy, the signal and idler wavelengths become well separated. Their indices of refraction therefore differ and the $c/2l$ separation of the signal and idler modes become different. Therefore, it is no longer possible for the combs of pump, signal, and idler modes to interact so as the sustain mode-locked operation of the OPO.

A singly-resonant OPO of the type mentioned above is described in an article entitled "Tunable Infrared Ultrashort Pulses From A Mode-Locked Parametric Oscillator", by Weisman et al, OPTICS COMMUNICATIONS, October 1976, pages 28-32, inclusive.

Another example of a proposed prior art optical parametric oscillator is the doubly-resonant OPO described in the paper of Becker et al entitled, "Analytic Expressions For Ultrashort Generation In Mode-Locked Optical Parametric Oscillators", JOURNAL OF APPLIED PHYSICS, September 1974, pages 3996-4005, inclusive.

OBJECTS AND SUMMARY OF THE INVENTION

A general object of this invention is the provision of solid state stable OPO apparatus with useful outputs in the infrared spectrum.

A further object is the provision of such OPO apparatus which is capable of being tuned over a relatively wide band without necessitating adjustment of the physical dimensions of the pump or OPO cavities.

These and other objects of the invention are achieved with solid state OPO apparatus in which the OPO cavity length is substantially smaller than the pump laser cavity length and in which the oscillator mirrors are singly resonant at either the signal or idler pulse frequencies. With such a configuration, the non-resonated OPO pulses replicate the mode-locked pump pulses and both sets of pulses couple to the resonated OPO pulse over a relatively wide tuning range without adversely affecting OPO operation.

DESCRIPTION OF THE DRAWINGS

FIG. 1 is a schematic block diagram of prior art OPO;

FIG. 2 is a similar diagram of an OPO embodying this invention;

FIG. 3 is a block diagram showing modified form of the invention;

DESCRIPTION OF PREFERRED EMBODIMENTS

Figure 4:
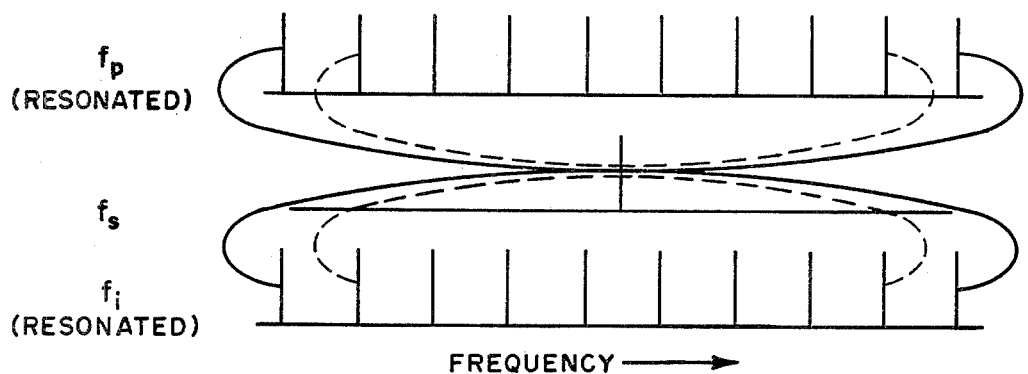
FIG. 4 is a representation of pump and OPO longitudinal modes which illustrate the operation of the prior art (singly-resonant) apparatus of FIG. 1.

Referring now to the drawings, FIG. 1 shows prior art OPO apparatus 10 which comprises a pump laser 11, an OPO 12 and a lens 13 for focusing the output of the pump laser into OPO 12. Laser 10 has a lasing rod 15 excited by a suitable source of energy, not shown, such as a flashing or continuous lamp, and mirros 16 and 17 having reflecting surfaces 16a and 17a, respectively, spaced apart by a distance $l_1$ which is the effective length of the pump laser cavity. An acousto-optic mode locker 18 between mirror 16 and rod 15 is suitably energized at the mode-locking frequency $c/2l_1$, where $c$ is the velocity of light, and produces a train of equally spaced extremely narrow output pulses from mirror 17.

The "effective length" of a cavity as used herein means summation of each distance segment $l_i$ within the cavity multiplied by its index of refraction n. Stated quantitatively, $$l_{eff} = \Sigma n_i l_i \qquad (2)$$

Thus, the effective length of pump laser 11 is equal to the sum of length of rod 15 multiplied by the index of refraction of the rod, and the length of mode locker 18 multiplied by its index of refraction, and the total length of air segments multiplied by unity.

The pump laser output is focused by lens 13 into OPO 12 which comprises a nonlinear optical crystal 20 and mirrors 21 and 22 on opposite sides of the crystal and having reflecting surfaces spaced apart by a distance $l_2$ which is the OPO effective cavity length. Crystal 20, by way of example, may consist of and preferably is lithium niobate ($LiNbO_3$). Mirrors 21 and 22 are highly transmissive at the laser pump frequency $f_p$ so that the pump output interacts with crystal 20 to produce pulses at the signal and idler frequencies to satisfy Equation (1) in the well known manner. Mirrors 21 and 22 are designed to be highly reflective at one or both of these OPO frequencies.

As mentioned above, successful operation of this OPO requires that the effective lengths $l_1$ and $l_2$ of the pump and OPO cavities, respectively, be equal.

In accordance with this invention, OPO apparatus 25, see FIG. 2, comprises a pump laser 26, an OPO 27 and a lens 13 which focuses the output of laser 26 into OPO 27. Many of the components of pump laser 26 and OPO 27 are essentially the same as those described in FIG. 1 and accordingly like parts are indicated by the primes of like reference characters on the drawings. Pump lasers 11 and 26 may be the same, or laser 26 optionally may include a Q-switch 28 as shown in order to produce pulsed "bursts" of mode-locked pulses. Mirrors 29 and 30 of OPO 27, however, are singly resonant at either the signal mode or the idler mode. Thus, mirrors 29 and 30 may be highly reflective at $f_i$ and transmissive at $f_p$ and $f_s$, thereby producing an output at the signal wavelength, or, alternatively, the mirrors may be highly reflective at $f_s$ and transmissive at $f_p$ and $f_i$ to produce an idler frequency output. Tuning of OPO 27 is accomplished either by changing the temperature of crystal 20' or by rotating same in the plane of the paper, both techniques being well known in the art.

As shown, the effective length $l_4$ of the OPO cavity is substantially smaller than the effective length $l_3$ of the cavity of pump laser 26. More specifically, $l_3 = nl_4$, where n is in the range of 5 to 50 and where this value represents typical n values for practical crystal lenghts and practical solid-state laser cavity lengths. This difference in effective cavity lengths $l_3$ and $l_4$ together with the above-mentioned singly resonant character of OPO mirrors 29 and 30 enables apparatus 25 to generate a stable mode-locked output from OPO 27 during tuning of the latter over a substantial frequency range. The principle of operation of this laser will be better understood from the discussion below of FIGS. 4 and 5.

In a modified form of the invention shown in FIG. 3, the OPO is disposed within the cavity of pump laser 35. Like components in FIGS. 2 and 3 are indicated by like reference characters on the drawings. OPO 36 comprises nonlinear crystal 37 and mirrors 38 and 39, the latter being formed as thin layers on opposite ends of the crystal. This OPO is disposed between mirror 17' and laser rod 15' and has an effective length $l_6$ substantially smaller than the pump laser effective cavity $l_5$ as discussed above with FIG. 2. Mirrors 38 and 39 are highly transmissive at the pump frequency $f_p$ and are singly resonant at either the signal frequency $f_s$ or the idler frequency $f_i$. Pump laser mirror 17' is highly transmissive at the non-resonated parametric mode frequency which is the output from the apparatus. The operation of this apparatus is essentially the same as the configuration of FIG. 2.

The principle of operation of prior art laser 10 is now explained by reference to FIG. 4. Pump cavity modes $f_p$ are equally spaced longitudinally as determined by the effective length of the pump cavity. In order to mode lock the OPO, the effective length $l_2$ (see FIG. 1) of the OPO cavity is made equal to effective length $l_1$ of the pump cavity. This enables the pump and signal modes to have equally spaced cavity resonances and to share the non-resonant idler mode $f_i$ which is produced as an output from the apparatus. The successful operation of this OPO is dependent upon exact equality of spacings of the signal and pump frequency "combs" as shown in FIG. 4. Any change in an OPO parameter such as the effective dielectric constant of the crystal as it is tuned causes the $f_p$ and $f_s$ comb spacings to become slightly different or to shift relative to each other and disrupt the frequency relationship of Equation (1). The result is that the signal and idler modes are then not able to share the same idler mode so that the OPO falls below threshold and ceases to operate.

Figure 5:
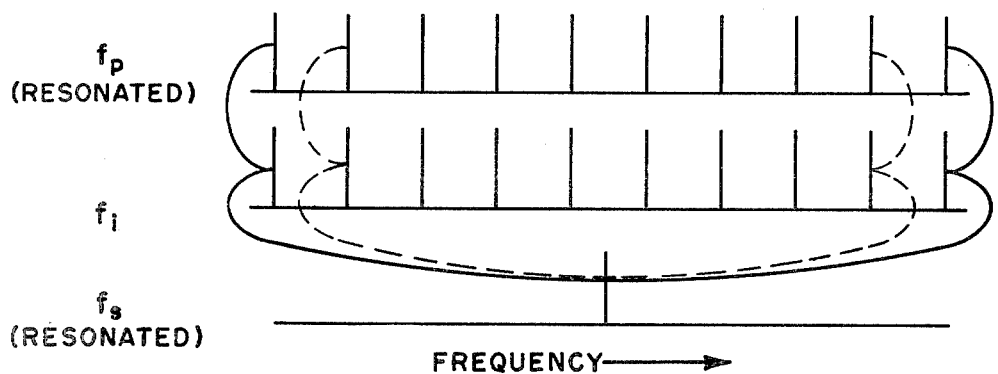
FIG. 5 is a representation of modes similar to FIG. 4 depicting the operation of the OPOs shown in FIGS. 2 and 3 in accordance with this invention.

FIG. 5 represents the operation of the apparatuses of FIGS. 2 and 3 in accordance with this invention. In these embodiments, the pump and signal modes are resonated and, accordingly, the frequencies of these modes occur on their respective longitudinal cavity resonances. Since the OPO cavity is substantially shorter than the pump cavity, the longitudinal modes of the signal are much more widely spaced than the pump longitudinal modes. In fact, as shown, only one signal longitudinal mode lies under the "comb" of the pump longitudinal modes. Since the idler frequency is not resonated, the idler modes occur wherever necessary in order to satisfy the relationship of Equation (1) and thus replicate the pump modes. Thus, the idler is effectively mode locked by the pump; that is to say, with the pump laser in the mode-locked condition, the pump modes have the amplitudes and relative phases that accompany a mode-locked pulse train. Since the comb of idler modes essentially replicates the comb of pump modes, the former too has the mode amplitudes and phases appropriate for a mode-locked pulse train. Thus, a mode-locked train of idler pulses is produced in accordance with this invention. The signal at $f_s$ is similarly mode locked when OPO mirrors are singly resonant at $f_i$.

What is claimed is:

1. Apparatus for producing mode-locked optical parametric oscillations comprising a pump laser having a cavity with an effective length $l_p$ and an output with a frequency $f_p$, means to mode lock said pump laser output, and an optical parametric oscillator (OPO) adapted to receive the mode-locked pump laser output comprising a nonlinear crystal, and first and second mirrors on opposite sides of said crystal with an effective spacing $l_o$ between said mirrors substantially less than $l_p$, said pump output interacting with said crystal for producing parametrically generated outputs having a signal frequency ($f_s$) and an idler frequency ($f_i$) which satisfy the relationship $$f_p = f_s + f_i,$$

said mirrors being highly reflective at the frequency of one of said crystal outputs and being highly transmissive at said pump output frequency and at the frequency of the other of said crystal outputs.

2. Apparatus according to claim 1 in which said OPO is located within said pump laser cavity.

3. Apparatus according to claim 2 in which said first and second mirrors are disposed on said crystal.

4. Apparatus according to claim 1 in which said OPO is located externally of said pump laser cavity.

5. Apparatus according to claim 1 in which said crystal is lithium niobate ($LiNbO_3$).

6. Apparatus according to claim 1 with Q-switch means associated with said pump laser, and means to actuate said switch means whereby to pulse said pump laser output.

7. Apparatus for producing mode-locked optical parametric oscillations comprising a pump laser having
  a lasing medium,
  means to energize said medium whereby to produce a coherent light pump beam at a frequency $f_p$,
  first and second mirrors on opposite sides, respectively, of said medium and having surfaces reflective at $f_p$,
  said mirror surfaces being spaced apart by a predetermined effective length $l_p$, and
  mode-locking means between said medium and one of said mirrors and operative to mode lock said pump beam, an OPO comprising
  a nonlinear crystal,
  third and fourth mirrors on opposite sides, respectively, of said crystal and being spaced apart by an effective length $l_o$ substantially less than $l_p$ and having reflective surfaces highly transmissive at $f_p$,
  said pump beam being directed through said third and fourth mirrors and through said crystal whereby to produce outputs therefrom having frequencies $f_s$ and $f_i$, respectively, satisfying the relationship $$f_p = f_s + f_i,$$

said third and fourth mirrors being high transmissive at $f_p$ and highly reflective at one of the crystal output frequencies, said fourth mirror being partially transmissive at the other of said crystal output frequencies.

8. Apparatus according to claim 7 in which said crystal and said third and fourth mirrors are disposed between said first and second mirrors.

9. Apparatus according to claim 7 in which said crystal and said third and fourth mirrors are disposed on the side of said second mirror opposite from said first mirror.

* * * * *